(12) United States Patent
Abadi et al.

(10) Patent No.: US 12,046,059 B2
(45) Date of Patent: Jul. 23, 2024

(54) DATA-DRIVEN TRANSACTION TERMINAL ITEM CODE CORRECTOR

(71) Applicant: NCR Voyix Corporation, Atlanta, GA (US)

(72) Inventors: Shiran Abadi, Tel-Aviv (IL); Itamar David Laserson, Givat Shmuel (IL); Tamar Miriam Haizler, Kfar-Saba (IL)

(73) Assignee: NCR Voyix Corporation, Atlanta, GA (US)

( * ) Notice: Subject to any disclaimer, the term of this patent is extended or adjusted under 35 U.S.C. 154(b) by 418 days.

(21) Appl. No.: 17/408,620

(22) Filed: Aug. 23, 2021

(65) Prior Publication Data

US 2023/0057000 A1 Feb. 23, 2023

(51) Int. Cl.
*G06F 17/00* (2019.01)
*G06F 18/214* (2023.01)
*G06N 20/00* (2019.01)
*G06Q 20/40* (2012.01)
*G06Q 30/0601* (2023.01)
*G06V 30/224* (2022.01)

(52) U.S. Cl.
CPC ........ *G06V 30/2247* (2022.01); *G06F 18/214* (2023.01); *G06N 20/00* (2019.01); *G06Q 20/407* (2013.01); *G06Q 30/0603* (2013.01)

(58) Field of Classification Search
CPC .. G06V 30/2247; G06N 20/00; G06F 18/214; G06Q 20/407; G06Q 30/0603
See application file for complete search history.

(56) References Cited

U.S. PATENT DOCUMENTS

| 7,264,163 | B2 * | 9/2007 | Heilper | G06Q 20/042 235/375 |
| 10,706,249 | B1 * | 7/2020 | Svetal | G06Q 20/208 |
| 11,494,750 | B2 * | 11/2022 | Crooks | G06Q 20/202 |
| 2006/0282331 | A1 * | 12/2006 | Jacobs | G07G 1/0054 705/22 |
| 2011/0119142 | A1 * | 5/2011 | Maraz | G06Q 20/202 705/302 |
| 2018/0285848 | A1 * | 10/2018 | Crooks | G06Q 20/202 |
| 2020/0234229 | A1 * | 7/2020 | Bolha | H04W 4/029 |
| 2022/0277313 | A1 * | 9/2022 | Migdal | G06Q 20/20 |
| 2023/0100172 | A1 * | 3/2023 | Crompton | G06Q 20/203 705/22 |

OTHER PUBLICATIONS

System and Method of Handling Items Not On File, Authors et al., IP.com No. IPCOM000012447D, Publication date May 7, 2003, 3 pages. (Year: 2003).*

* cited by examiner

*Primary Examiner* — Mohammed H Zuberi
(74) *Attorney, Agent, or Firm* — Schwegman Lundberg & Woessner, P.A.

(57) ABSTRACT

An unrecognized item code is identified during a transaction at a transaction terminal. When the unrecognized code is determined to be associated with a typographical error, alternative corrected item codes are supplied to the transaction terminal to replace the unrecognized code. When the unrecognized code is determined to be missing from a product catalogue, an ordered list of most likely corrected item codes for the unrecognized code is provided to the transaction terminal for selection of one of the corrected item codes by an operator.

8 Claims, 3 Drawing Sheets

DATA-DRIVEN TRANSACTION TERMINAL ITEM CODE CORRECTOR

BACKGROUND

One of the most time-consuming errors at a Point-Of-Sale (POS) terminal during a checkout of a customer is an error associated with an item code "Not on File" (NOF). Analysis of just a few decent-sized retailers reveals that NOF errors cost each retailer approximately between $300K to $400K.

An NOF error is a situation where a cashier provides an item code (through scan or manual entry), which is unknown to the retailer's catalogue service. Observations revealed that NOF errors can happen more than 10,000 to 15,000 a day with a decent-sized retailer (roughly 200 retail stores). These errors can translate into 6,000 to 14,000 annual lost work hours even assuming a small amount of time is needed by an average cashier to resolve (such as one minute to resolve).

When a NOF error happens, in a best-case scenario, the cashier is able to resolve the unrecognized item code with a retailer-recognized item code and the cashier re-enters the retailer-recognized item code for the customer transaction. In a worst-case scenario, where the cashier is unable to identify an acceptable retailer-recognized item code for the NOF item code, the item is either not sold (lost revenue) or the cashier enters a department sale where the price is manually overridden and typically, erroneously keyed in by the cashier. Overridden and erroneously entered codes and prices propagate errors into the retailer's inventory management system causing substantial overhead to remedy.

Roughly one-third of NOF errors are the result of keying errors by the cashier when keying in a given item code, such as transposing characters, missing characters, a space between characters, adding too many characters, etc. Two-thirds of NOF errors are the result of a retailer catalogue mistake or the result of a given item code for a given item being associated with a supplier-specific item code from a supplier of the retailer, where the retailer's catalogue does not recognize the supplier-specific item code and uses a different item code for the given item.

SUMMARY

In various embodiments, system and a method for a data-driven transaction terminal item code corrector are presented.

According to an aspect, a method for correcting item codes that are unrecognized during a transaction at a transaction terminal is presented. An unrecognized item code is detected during a transaction at a transaction terminal. At least one replacement item code is provided to the transaction terminal as a replacement for the unrecognized item code.

DETAILED DESCRIPTION

Figure 1:
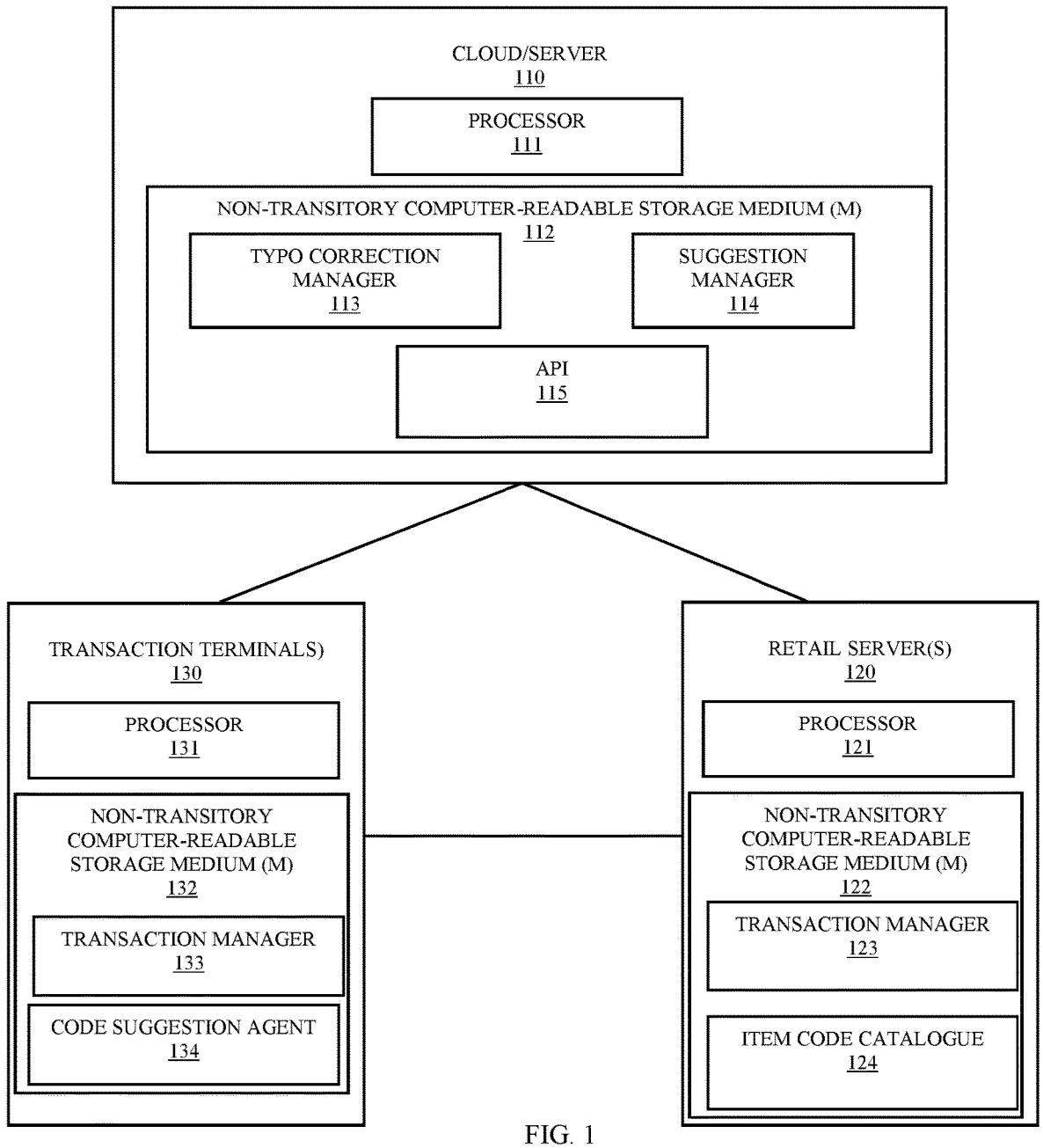
FIG. 1 is a diagram of a system for a data-driven transaction terminal item code corrector, according to an example embodiment.

FIG. 1 is a diagram of a system 100 for a data-driven transaction terminal item code corrector, according to an example embodiment. It is to be noted that the components are shown schematically in greatly simplified form, with only those components relevant to understanding of the embodiments being illustrated.

Furthermore, the various components (that are identified in FIG. 1) are illustrated and the arrangement of the components is presented for purposes of illustration only. It is to be noted that other arrangements with more or less components are possible without departing from the teachings of a data-driven transaction terminal item code corrector presented herein and below.

System 100 and the techniques that follow provide real-time item code corrections and item code suggested corrections during a transaction when unrecognized item codes are provided. Typographical NOF errors are automatically recognized and corrected by processing a pairwise sequence alignment algorithm. NOF errors associated with Item codes that are missing from a given retailer's catalogue are monitored for corrections provided by cashiers when first detected at transaction terminals of the retailers. When the same item codes are detected during subsequent transactions, the cashiers are provided the most-prevalent and likely correct item code suggestions based on an analysis as to how the initial item code errors were resolved. This means that an item code missing from the catalogue only remains unknown for a short period of time and does not continue to propagate with subsequent transactions associated with a given retailer.

As used herein, the term "operator" refers to an individual that is processing a transaction at a transaction terminal. During a customer-assisted transaction, the operator is referred to as a cashier. During a self-service transaction, the operator is referred to as a customer, a consumer, and/or a user.

NOF errors are chronic issues facing the retail industry as discussed above. However, the errors follow repeatable patterns. For example, when a cashier has one type of typographical error, the error naturally recurs in many cases as the nature of typos is common. Often the error is restricted to a single character mistake.

For NOF errors associated with catalogue and barcode issues, a given error is often repeated many times (frequency of error is high) and is associated with a same barcode (same string of characters) that is consistently unrecognized in the catalogue by multiple operators across multiple transaction terminals during a single day. The problem is that multiple different items in a single day can be each be associated with unrecognized barcodes (item codes). Thus, if unrecognized barcodes are not accounted for quickly, the inventory and account problems associated with correcting the mistakes can quickly mount for a retailer.

It is within this context that system 100 and its embodiments are now discussed with initial reference to FIG. 1.

System 100 comprises a cloud/server 110, a plurality of transaction terminals 130, and one or more retail servers 120.

Cloud/Server 110 comprises at least one processor 111 and a non-transitory computer-readable storage medium 112. Medium 112 comprises executable instructions for a typographical (typo) manager 113, an Application Programming Interface (API) 115, and a suggestion manager 114. The executable instructions when executed by processor 111 from the medium 112 cause processor 111 to perform operations discussed herein and below with typo correction manager 113, API 115, and suggestion manager 114.

Each transaction terminal 120 comprises a processor 121 and a non-transitory computer-readable storage medium 122. Medium 122 comprises executable instructions for a transaction manager 123 and code suggestion agent 124. The executable instructions when executed by processor 121 from medium 122 cause processor 121 to perform operations discussed herein and below with respect to transaction manager 123 and code suggestion agent 124.

Each retail server 130 comprises a processor 131 and a non-transitory computer-readable storage medium 132. Medium 132 comprises executable instructions for a transaction manager 133 and interfaces to an item code catalogue 134. The executable instructions when executed by processor 131 from medium 132 cause processor 131 to perform operations discussed herein and below with respect to transaction manager 133 and interfaces to item code catalogue 134. Item code catalogue also includes item information (data) for items of the retailer, such as Product Look-Up (PKU) codes, barcodes (item codes), item description, item pricing, item inventory, links to item promotions/discounts, etc.

During a transaction, transaction manager 133 or transaction manager 123 raises an NOF event or an NOF alert when a given item code is not identified in the item code catalogue 124. The event is trapped and sent via API 115 along with a variety of transaction information for the transaction, such as retailer identifier for the retailer, store identifier for the store, transaction terminal identifier for the terminal 130, operator identifier for the operator of terminal 130, date, time of day, the entered or scanned item code (barcode) that was unable to be matched to a specific item in the item code catalogue 124, pending transaction information for already scanned or entered other items associated with the transaction, transaction terminal type (POS or Self-Service Terminal), etc.

Suggestion manager 114 actively monitors the NOF errors reported for a given store, a given set of stores for a given retailer, a given transaction terminal 130 and/or a set of transaction terminals 130. Each candidate item code (the item code processed which did not match within the item code catalogue 124) is maintained along with a current frequency count.

Any item code entered as a correction to the unidentified item code is recorded by transaction manager 133 when the operator enters a corrected item code for the transaction. This corrected item code entered by the operator is reported via API 115 by transaction manager 133 and/or transaction manager 123. The corrected item code is associated with the original unrecognized item code by suggestion manager 114 along with the transaction information. A record pair of an incorrect item code and a corrected item code is also maintained by suggestion manager 114 with a frequency counter. For example, consider suggestion manager 114 identifies that an incorrect item code 1234 was detected 30 times in a last hour of time, 20 of those item codes were corrected with corrected item code 1235, 5 were corrected with corrected item code 1236, 3 were corrected with corrected item code 1237, 1 was corrected with item code 1238, and 1 was corrected with corrected item code 1239. These record pairs between the incorrect item code and the corrected item code used are maintained with frequency/occurrence counters. When the incorrect item code is detected from terminal 130 during a $31^{st}$ transaction and the NOF event is raised with the incorrect/unrecognized scanned or entered item code, suggestion manager 114 sends a set of alternative item codes to code suggestion agent 134 via API 115. The set is sent in probably or likely corrected item code order as suggested corrected item codes "1235 (20 corrections), 1236 (5 corrections), 1237 (3 corrections), 1238 (1 correction), and 1239 (1 correction). Code suggestion agent 134 causes the transaction interface for transaction manager 133 to display the priority/probable/likely corrected item code order on a transaction screen to the operator. When the operator makes a selection, such as for 1235, suggestion manager 114 updates the frequency counter for the corrected item 1235 to 21.

Notice that suggestion manager 114 can control the corrected item code in a matter of minutes within a single store or multiple stores of the retailer to the most likely and most probably corrected item code of 1235. This is significant because it would conventionally take a day or more for the item code catalogue 124 to be updated to account for the incorrect item code during which time thousands of incorrect item codes may have been encountered during transactions by the retailer. Furthermore, the operators of terminals 130 can obtain the corrected item code in near real time, which means that transaction throughput is only marginally impacted, and throughput improves each time a transaction with unrecognized item code 1234 is encountered and 1235 is selected as the corrected item code.

Suggestion manager 114 leverages enterprise-wide knowledge and information in real-time for difficult NOF errors associated with unrecognized item codes that are missing from item code catalogue. Thus, when a supplier or new supplier of a retailer sends items with an item code for an item that is not used by the retailer and not present in the item catalogue 124, the item code for the item that is recognized by the retailer can be identified in real time and communicated via suggestion manager 114, API 115, code suggestion agent 134, and transaction manager 133 to the operators of terminals 130 as a correct item code.

Typo correction manager 113 can run simultaneously and in parallel with suggestion manager 114 for purposes of determining when there has been a typographical error. Typo correction manager 113 may comprise one or more Machine-Learning Models (MLMs) trained to identify and auto correct typographical errors entered by an operator during a transaction.

A leveraged and pairwise sequence alignment (e.g., Needleman-Wunsch) algorithm that was originally developed for aligning two biological sequences is enhanced within the MLM. The algorithm finds an optimal alignment of the characters in the provided item code, given a scoring scheme for a match, a mismatch, and a gap. The typographical error types are classified into 4 categories: deletion of a character, insertion of a character, substitution of a character with a different character, and swap of character positions. The MLM is enhanced to account for swapping of character positions, which is not accounted for in a conventional pairwise sequence alignment algorithm, since a conventional pairwise sequence alignment algorithm fails to account for swapping of character positions. As such, the algorithm is adjusted to account for other potential typographical errors that are not accounted for in the native pairwise alignment algorithm, such as duplication of a single character. The penalty given to a mismatch is specific to the identity of the substituted characters. This is done because intuitively some typos are more likely than others due to their proximity on a keypad used by an operator to enter an item code (when manually entered and not scanned for entry). So, the MLM is trained for a given pair of barcodes (item codes) both an erroneous typed code and its correction to learn unknown parameters of the algorithm, i.e., the scores/penalties for a match, a mismatch, a gap, and a character swap. Because typing errors are generally consistent and should not be dependent on training data, the MLM is trained seldomly and just to verify its consistency.

In an embodiment, when a NOF error event is raised via API 115 from transaction manager 133 and/or transaction manager 123, both typo correction manager 113 and suggestion manager 114 are processed in parallel with the incorrect item code associated with the NOF error event. Any proposed corrected item code produced by the MLM of the typo correction manager will include a confidence value/accuracy score (e.g., the enhanced pairwise alignment algorithm's score), such that when the confidence value/score is above a configured threshold, results returned by the suggestion manager 114 are provided back to code suggestion agent 134 for near real-time display to the operator of an ordered list of suggested corrected item codes. Conversely, when the confidence value/accuracy score provided by the MLM of typo correction manager 113 is below the configured threshold, the corrected item code returned by typo correction manager 113 is provided to code suggestion agent 134 for near real-time display to the operator for automatic selection by the operator via a transaction interface of transaction manager 133. In an embodiment, when the corrected item code is associated with a typographical arrow, code suggestion agent 134 may automatically supply the corrected item code to transaction manager 133, such that the operator does not have to perform any action whatsoever.

In an embodiment, when a NOF event is raised via API 115 from transaction manager 133 and/or transaction manager 123, a fast search is performed on the unrecognized item code via suggestion manager 114. If the search returns an unrecognized item code that includes a frequency count above a configured threshold, the unrecognized item code is immediately handled by the suggestion manager 114 without the need to process the model of typo correction manager 113. This is an indication that the retailer has encountered this incorrect or unrecognized item code with enough frequency to know that the unrecognized item code was not associated with any typographical error and is likely associated with an item code used by a supplier on a product that is different from that which is used by the retailer within item code catalogue 124.

In an embodiment, when a NOF event is raised via API 115 from transaction manager 133 and/or transaction manager 123 and a fast search performed by suggestion manager 114 indicates an unrecognized item code that has been replaced with a specific corrected item code above a threshold frequency of occurrence level, API 115 can instruct code suggestion agent 134 to automatically interact with transaction manager 133 and replace the unrecognized item code with the corrected item code without requiring any selection or input from the operator of terminal 130. This can substantially speed transaction throughput when it becomes clear that the item code catalogue needs to be updated with a supplier-used item code for an item and until it is updated, the mapping between the supplier-used item code and the retailer-used item code for a given item can be changed seamlessly and transparently on behalf of the operator.

In an embodiment, typo correction manager 113, API 115, and suggestion manager 114 are provided as Software-as-a-Service (SaaS).

In an embodiment, the transaction terminal 130 is a POS terminal with an operator being a cashier or an SST with an operator being a customer performing a self checkout. In an embodiment, terminal 130 can be a standalone checkout station or a mobile device (e.g., a tablet, a phone, a laptop, or a wearable processing device).

In an embodiment, code suggestion agent 134 includes its own User Interface (UI) that pops up a selection screen for an incorrect item code for the operator of terminal 130 to select a corrected item code via a single operator touch or tap within the UI. Here, once the operator selects a corrected item code produced by typo correction manager 113 and/or suggestion manager 114, code suggestion agent 134 instructs transaction manager 133 or transaction manager 123 to take the selected corrected item code as a replacement for the original unrecognized item code for continued transaction processing during the transaction on terminal 130.

The above-referenced embodiments and other embodiments are now discussed with reference to FIGS. 2 and 3.

Figure 2:
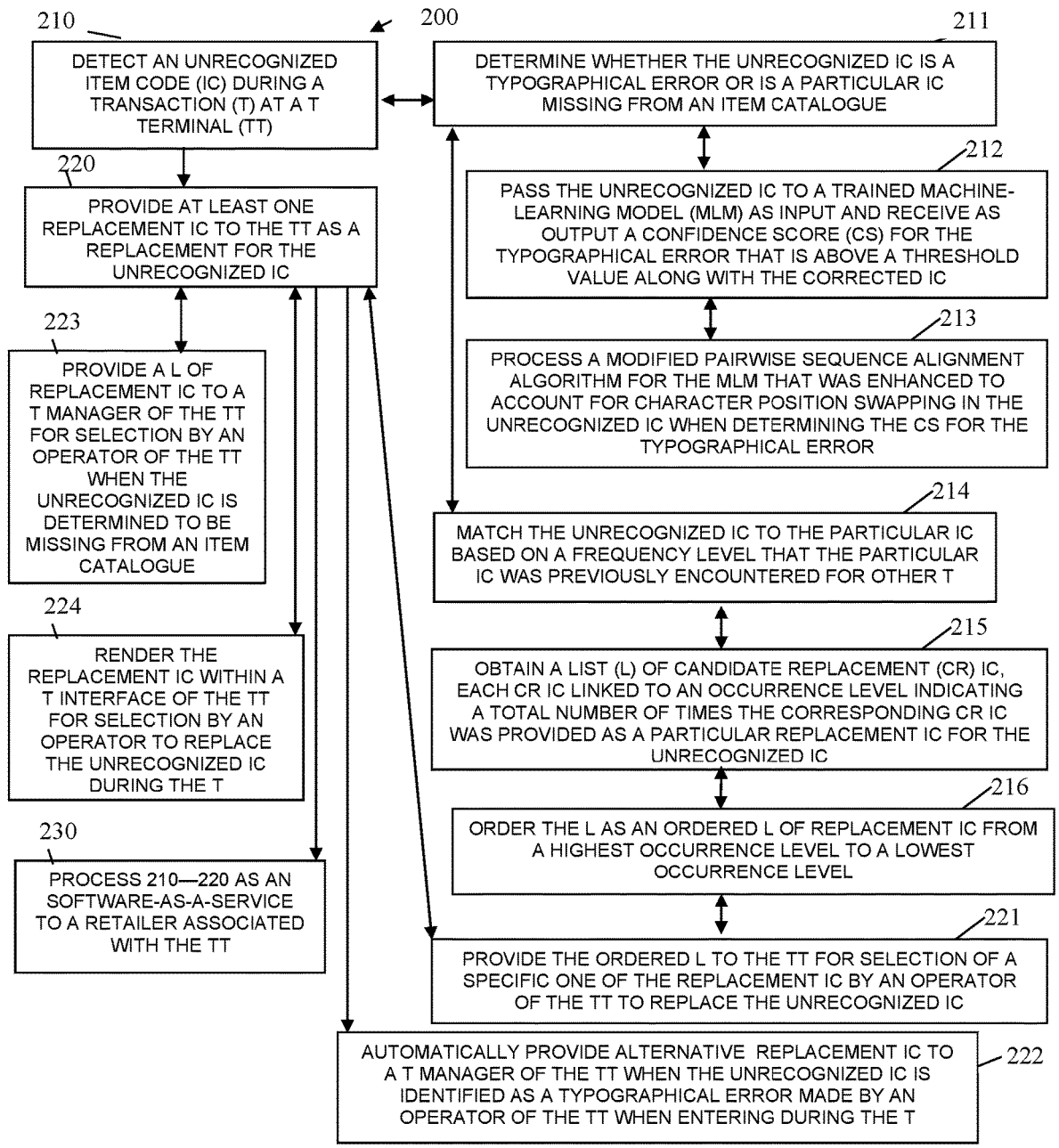
FIG. 2 is a diagram of a method for correcting item codes that are unrecognized during a transaction at a transaction terminal, according to an example embodiment.

FIG. 2 is a diagram of a method 200 for correcting item codes that are unrecognized during a transaction at a transaction terminal, according to an example embodiment. The software module(s) that implements the method 200 is referred to as an "item code corrector." The item code corrector is implemented as executable instructions programmed and residing within memory and/or a non-transitory computer-readable (processor-readable) storage medium and executed by one or more processors of one or more devices. The processor(s) of the device(s) that executes the item code corrector are specifically configured and programmed to process the item code corrector. The item code corrector has access to one or more network connections during its processing. The connections can be wired, wireless, or a combination of wired and wireless.

In an embodiment, the device that executes the item code corrector is cloud 110. In an embodiment, the device that executes item code corrector is server 110.

In an embodiment, the item code corrector is all of, or some combination of typo correction manager 113, suggestion manager 114, and API 115.

At 210, item code corrector detects an unrecognized item code during a transaction at a transaction terminal. This can be done when the item code corrector detects a NOF transaction event raised along with the unrecognized item code (as was discussed above).

In an embodiment, at 211, the item code corrector determines whether the unrecognized item code is a typographical error or is a particular item code that is missing from an item/product catalogue. This can be done in parallel by processing the unrecognized item code simultaneously with the typo correction manager 113 and with the suggestion manager 114. Alternatively, this can be done separately as was discussed above.

In an embodiment of 211 and at 212, the item code corrector passes the unrecognized item code to a trained-machine learning model (MLM) as input and receives as output a confidence score for the typographical error that is above a threshold value along with the corrected item code for the unrecognized item code.

In an embodiment of 212 and at 213, the item code corrector processes a modified pairwise sequence alignment algorithm for the MLM that was enhanced to account for character position swapping in the unrecognized item code when determining the confidence score for the typographical error.

In an embodiment of 211 and at 214, the item code corrector matches the unrecognized item code to the particular item code based on a frequency level that the particular item code was previously used to replace the unrecognized item code for other transactions.

In an embodiment of 214 and at 215, the item code corrector obtains a list of candidate replacement item codes. Each candidate replacement item code linked to an occurrence level indicating a total number of times the corresponding candidate replacement item code was provided as a particular replacement item code for the unrecognized item code.

In an embodiment of 215 and at 216, the item code corrector orders the list as an ordered list of replacement item codes from the highest occurrence level to a lowest occurrence level.

At 220, the item code corrector provides at least one replacement item code to the transaction terminal as a replacement for the unrecognized item code during processing of the transaction at the transaction terminal.

In an embodiment of 216 and 220, at 221, the item code corrector provides the ordered list to the transaction terminal for selection of a specific one of the replacement item codes by an operator of the transaction terminal to replace the unrecognized item code.

In an embodiment of 220, at 222, the item code corrector automatically provides alternative replacement item codes to a transaction manager of the transaction terminal when the unrecognized item code is identified as being a typographical error made by an operator of the transaction terminal when entering the unrecognized item code during the transaction.

In an embodiment of 220, at 223, the item code corrector provides a list of replacement item codes to a transaction manager of the transaction terminal for selection by an operator of the transaction terminal when the unrecognized item code is determined to not be a typographical error and when the unrecognized item code is determined to be missing from an item/product catalogue.

In an embodiment of 220, at 224, the item code corrector renders the replacement item code within a transaction interface for the transaction terminal for selection by an operator to replace the unrecognized item code during the transaction.

According to an embodiment, at 230, the item code corrector is provided and processed from a cloud processing environment as a SaaS to a retailer associated with the transaction terminal.

Figure 3:
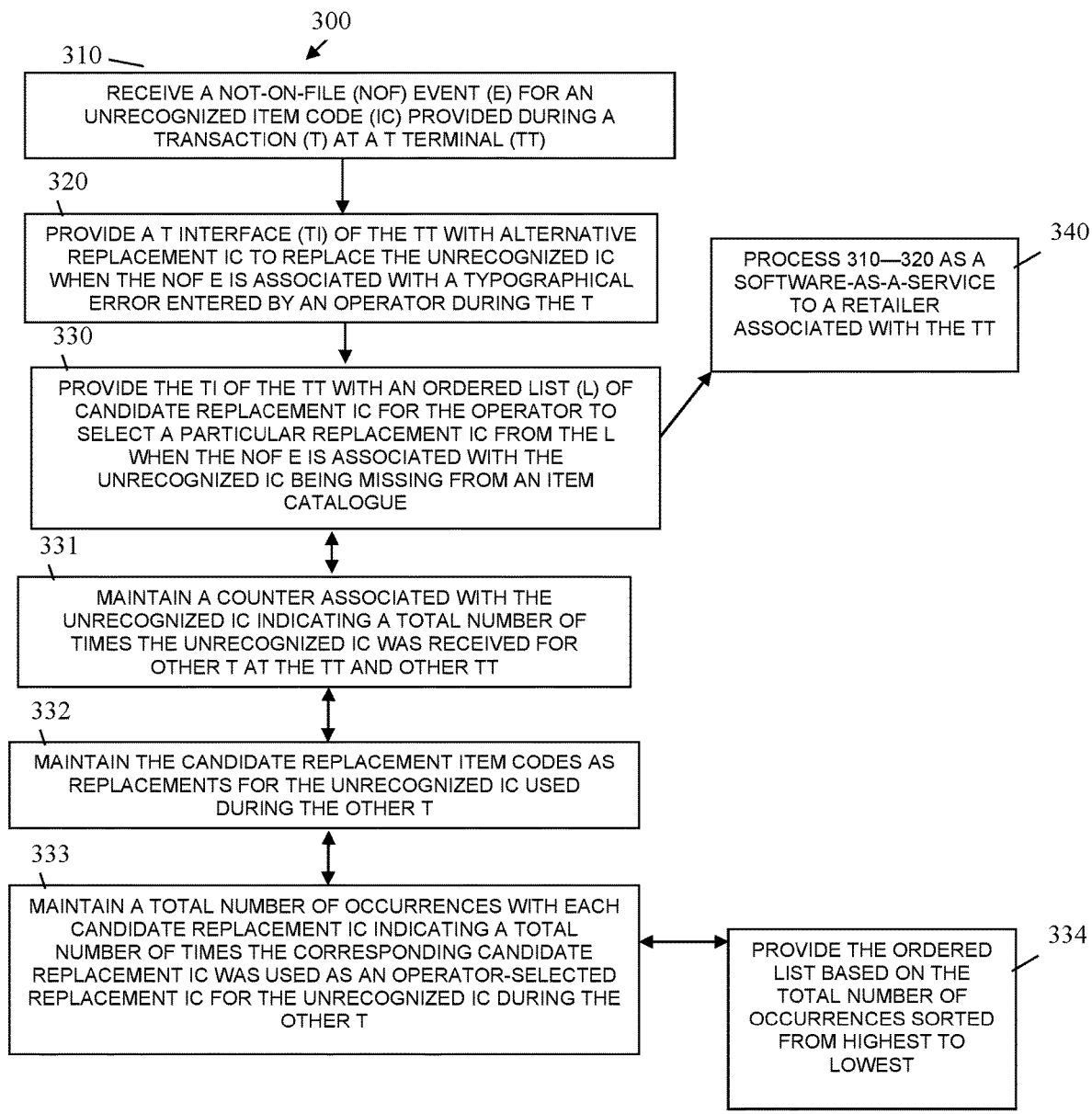
FIG. 3 is a diagram of another method for correcting item codes that are unrecognized during a transaction at a transaction terminal, according to an example embodiment.

FIG. 3 is a diagram of another method 300 for correcting item codes that are unrecognized during a transaction at a transaction terminal, according to an example embodiment. The software module(s) that implements the method 300 is referred to as an "item code suggestion manager." The item code suggestion manager is implemented as executable instructions programmed and residing within memory and/or a non-transitory computer-readable (processor-readable) storage medium and executed by one or more processors of one or more devices. The processor(s) of the device(s) that executes the item code suggestion manager are specifically configured and programmed to process the item code suggestion manager. The item code suggestion manager has access to one or more network connections during its processing. The network connections can be wired, wireless, or a combination of wired and wireless.

In an embodiment, the device that executes the item code suggestion manager is cloud 110. In an embodiment, the device that executes the item code suggestion manager is server 110.

In an embodiment, the item code suggestion manager is all of, or some combination of typo correction manager 113, suggestion manager 114, API 115, code suggestion agent 134, and/or method 200.

The item code suggestion manager presents another and, in some ways, enhanced processing perspective from that which was discussed above with the method 200 of the FIG. 2.

At 310, the item code suggestion manager receives a NOF event for an unrecognized item code during a transaction at a transaction terminal.

At 320, the item code suggestion manager provides a transaction interface of the transaction terminal with alternative replacement item codes to replace the unrecognized item code when the NOF even is associated with a typographical error entered by an operator during the transaction.

At 330, the item code suggestion manager provides the transaction interface of the transaction terminal with an ordered list of candidate replacement item codes for the operator to select a particular replacement item code from the list when the NOF event is associated with the unrecognized item code being missing from an item/product item catalogue.

In an embodiment of 330, at 331, the item code suggestion manager maintains a counter associated with the unrecognized item code indicating a total number of times the unrecognized item code was received or identified for other transactions at the transaction terminal or at other transaction terminals.

In an embodiment of 331 and at 332, the item code suggestion manager maintains the candidate replacement item codes as replacements for the unrecognized item code used during the other transactions.

In an embodiment of 332 and at 333, the item code suggestion manager maintains a total number of occurrences with each candidate replacement item code indicating a total number of times the corresponding candidate replacement item code was used as an operator-selected replacement item code for the unrecognized item code during the other transactions.

In an embodiment of 333 and at 334, the item code suggestion manager provides the ordered list based on the total number of occurrences sorted from highest to lowest.

In an embodiment, at 340, the item code suggestion manager is processed and provided from a cloud processing environment as a SaaS to a retailer associated with the transaction terminal.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
   detecting an unrecognized item code during a transaction at a transaction terminal,
   wherein detecting further includes determining whether the unrecognized item code is a typographical error or is a particular item code missing from an item catalogue,
   wherein determining further includes passing the unrecognized item code to a trained machine-learning model as input and receiving as output a confidence score for the typographical error that is above a threshold value along with the corrected item code,
   wherein passing further includes processing a modified pairwise sequence alignment algorithm for the trained machine-learning model that was enhanced to account for character position swapping in the unrecognized item code when determining the confidence score for the typographical error; and
   providing at least one replacement item code to the transaction terminal as a replacement for the unrecognized item code.

2. The method of claim 1, wherein providing further includes automatically providing alternative replacement item codes to a transaction manager of the transaction terminal when the unrecognized item code is identified as a typographical error made by an operator of the transaction terminal when entering the unrecognized item code during the transaction.

3. The method of claim 1, wherein providing further includes providing a list of replacement item codes to a transaction manager of the transaction terminal for a selection by an operator of the transaction terminal when the unrecognized item code is determined to be missing from an item catalogue.

4. The method of claim 1, wherein providing further includes rendering the at least one replacement item code within a transaction interface of the transaction terminal for selection by an operator of the transaction terminal to replace the unrecognized item code during the transaction.

5. The method of claim 1 further comprising, processing the method as a Software-as-a-Service (SaaS) to a retailer associated with the transaction terminal.

6. A method comprising:
   detecting an unrecognized item code during a transaction at a transaction terminal,
   wherein detecting further includes determining whether the unrecognized item code is a typographical error or is a particular item code missing from an item catalogue,
   wherein determining further includes matching the unrecognized item code to the particular item code based on a frequency level that the particular item code was previously encountered for other transactions,
   wherein matching further includes obtaining a list of candidate replacement item codes, wherein each candidate replacement item code linked to an occurrence level indicating a total number of times the corresponding candidate replacement item code was provided as a particular replacement item code for the unrecognized item code;
   providing at least one replacement item code to the transaction terminal as a replacement for the unrecognized item code.

7. The method of claim 5, wherein obtaining further includes ordering the list as an ordered list of replacement item codes from highest occurrence level to a lowest occurrence level.

8. The method of claim 7, wherein providing further includes providing the ordered list of replacement item codes to the transaction terminal for selection of a specific one of the replacement item codes by an operator of the transaction terminal to replace the unrecognized item code.

* * * * *